(12) United States Patent
Lee et al.

(10) Patent No.: US 9,829,107 B2
(45) Date of Patent: Nov. 28, 2017

(54) OIL SEALING DEVICE FOR A BEARING

(71) Applicant: KOREA INSTITUTE OF SCIENCE AND TECHNOLOGY, Seoul (KR)

(72) Inventors: Yong Bok Lee, Seoul (KR); Eo Jin Kim, Seoul (KR); Jeon Kook Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/374,015

(22) Filed: Dec. 9, 2016

(65) Prior Publication Data

US 2017/0292610 A1 Oct. 12, 2017

(30) Foreign Application Priority Data

Apr. 12, 2016 (KR) .................... 10-2016-0044746
Oct. 27, 2016 (KR) .................... 10-2016-0140937

(51) Int. Cl.
*F16J 15/44* (2006.01)
*F16J 15/3288* (2016.01)
*F16J 15/3296* (2016.01)
*F16C 33/76* (2006.01)

(52) U.S. Cl.
CPC .......... *F16J 15/3288* (2013.01); *F16C 33/76* (2013.01); *F16J 15/3296* (2013.01)

(58) Field of Classification Search
CPC ................ F16J 15/3288; F16J 15/3296
See application file for complete search history.

(56) References Cited

U.S. PATENT DOCUMENTS

| 5,997,004 A | 12/1999 | Braun et al. |
| 6,098,990 A * | 8/2000 | Marnot ................. F16J 15/008 277/551 |
| 6,142,477 A | 11/2000 | Meinzer |
| 8,490,980 B2 * | 7/2013 | Wright ................. F01D 11/00 277/355 |
| 9,121,299 B2 * | 9/2015 | Giametta ............... F01D 11/08 |
| 2008/0265514 A1 * | 10/2008 | Mortzheim ............ F01D 11/00 277/303 |
| 2009/0008881 A1 | 1/2009 | Lee et al. |
| 2012/0177483 A1 * | 7/2012 | Ali ........................ F01D 11/08 415/173.3 |
| 2014/0020390 A1 | 1/2014 | Rhoden et al. |

FOREIGN PATENT DOCUMENTS

| JP | 2003-214110 A | 7/2003 |
| KR | 10-0825081 B1 | 4/2008 |
| KR | 10-2009-0004032 A | 1/2009 |
| KR | 10-2012-0026335 A | 3/2012 |
| KR | 10-1484879 B1 | 1/2015 |

* cited by examiner

*Primary Examiner* — Gilbert Lee
(74) *Attorney, Agent, or Firm* — NSIP Law

(57) ABSTRACT

An oil sealing device for preventing a leakage of an oil of a bearing which supports a rotary shaft of a rotating machine has a brush member having a plurality of bristles in contact with the rotary shaft, and an actuator configured to move the brush member in a length direction of the rotary shaft, wherein a sloped surface having different heights along a length direction of the rotary shaft is formed at the rotary shaft, and wherein when the bristles are worn, the actuator moves the brush member in a length direction of the rotary shaft so that the bristles comes into contact with the sloped surface.

7 Claims, 9 Drawing Sheets

OIL SEALING DEVICE FOR A BEARING

CROSS-REFERENCE TO RELATED APPLICATION

This application claims priority to Korean Patent Applications No. 10-2016-0044746, filed on Apr. 12, 2016 and No. 10-2016-0140937, filed on Oct. 27, 2016, and all the benefits accruing therefrom under 35 U.S.C. §119, the contents of which in its entirety are herein incorporated by reference.

BACKGROUND

1. Field

The present disclosure relates to an oil sealing device for a bearing, and more particularly, to an oil sealing device for preventing a leakage of an oil of a bearing which supports a rotary shaft of a rotating machine where the rotary shaft rotates at a high speed.

[Description about National Research and Development Support]

This study was supported by the Junior Researcher Support Project of Ministry of Science, ICT and Future Planning, Republic of Korea (Project No. 1711030389) under the superintendence of National Research Foundation of Korea.

2. Description of the Related Art

A bearing is used for supporting a rotary shaft which rotates at a high speed at a rotating machine such as a motor, a power generator and various turbo devices.

A lubricating oil or a suitable lubricating fluid (hereinafter, referred to as "oil") is supplied to the bearing in order to prevent heat emission caused by high-speed rotation and also ensure smooth rotation.

In order to improve the performance of the rotating machine, it is required to allow the oil to circulate only within a given route. However, the oil supplied to the bearing lay leak out of a bearing housing due to a rotation force of the bearing or the rotary shaft or a difference between inner and outer pressures.

At long-time driving, the leaked oil may deteriorate the lubricating characteristic of the bearing and increase an amount of heat emitted from the lubrication system, and the oil may be scattered to contaminate other components of the rotating machine.

In addition, minute dust in the outside air may penetrate into the bearing and give a fatal influence on the operation of the bearing.

Therefore, an oil sealing device is generally installed to the rotating machine at a side of the bearing in order to prevent the oil from leaking out of the bearing housing and also prevent dust from penetrating therein. The oil sealing device is also called a deflector.

The oil sealing device is classified into a brush seal type in which bristles substantially come into contact with the rotary shaft to seal the rotary shaft, and a labyrinth seal type with no contact.

It is known that the brush seal-type oil sealing device, which is a contact type, has more excellent sealing capability than the labyrinth seal-type oil sealing device.

FIG. 1 shows an existing brush seal-type oil sealing device.

As shown FIG. 1, in the existing technique, a brush member 200 having a brush 210 composed of a plurality of bristles 201 is installed along a periphery of a rotary shaft 10.

Though it is partially shown in FIG. 1, the brush member 200 has a ring shape surrounding the rotary shaft 10, and the brush 210 is also disposed in a ring shape.

Though not shown in the figure, a bearing is connected to the rotary shaft 10, and the brush member 200 is disposed at a side of the bearing.

The plurality of bristles 201 of the brush member 200 are in contact with an outer diameter of rotary shaft 10.

At an initial installation stage, the plurality of bristles 201 disposed densely prevent the oil of the bearing from leaking out of the bearing housing and also prevent the oil from being scattered, thereby preventing contamination caused by leaked oil and also ensuring smooth rotating operation.

The brush seal-type oil sealing device configured as above has relatively excellent sealing capability, but the bristles 201 are worn out continuously since they operates in direct contact with the rotary shaft 10 rotating at a high speed.

While rotating, the rotary shaft 10 gives a kind of whirling phenomenon, and the bristles 201 are worn and shortened due to the whirling phenomenon, which may create a clearance or gap between the bristles 201 and the rotary shaft 10.

FIG. 2 shows that a gap g is formed the bristles 201 and the rotary shaft 10.

At long-time driving, the gap g is increasing further, and thus an amount of leaked oil is also increasing.

Due to the gap, the oil sealing device may not function well, and the problems caused by leaked oil or scattered oil may be caused as they were.

In order to solve the above problems, there have been made various attempts for adjusting a clearance and thus improving a sealing effect of the sealing device, but a variable-clearance technique may not be easily applied to an actual system since a sensor or the like for measuring an accurate location of a brush are provided.

SUMMARY

The present disclosure is directed to providing an oil sealing device which may enhance operation efficiency and safety of a rotating machine by adjusting a gap between bristles and a rotary shaft to minimize abrasion of the bristles according to time, when a brush-type oil sealing device is applied to the rotating machine.

In one aspect of the present disclosure, there is provided an oil sealing device for preventing a leakage of an oil of a bearing which supports a rotary shaft of a rotating machine, the oil sealing device comprising: a brush member having a plurality of bristles in contact with the rotary shaft; and an actuator configured to move the brush member in a length direction of the rotary shaft, wherein a sloped surface having different heights along a length direction of the rotary shaft is formed at the rotary shaft, and wherein when the bristles are worn, the actuator moves the brush member in a length direction of the rotary shaft so that the bristles comes into contact with the sloped surface.

In an embodiment, the actuator may move the brush member so that the bristles climb up along the sloped surface according to an abrasion amount of the bristles.

In an embodiment, the actuator may be a piezoelectric actuator having a piezoelectric element whose length changes when a voltage is applied thereto, and the brush member may move according to the changed length of the piezoelectric actuator.

In an embodiment, the oil sealing device may include a controller for controlling a length of the piezoelectric actuator by using data of an abrasion amount of the bristles according to a rotation speed and an operation time of the rotary shaft.

In an embodiment, the actuator may be a spring actuator having a spring with an elastic restoration force for pushing or pulling the brush member in a length direction of the rotary shaft, and the elastic restoration force of the spring may be balanced with a frictional force generated when the bristles come into contact with the rotary shaft.

In an embodiment, when the bristles are worn and thus the frictional force between the bristles and the rotary shaft is weakened or removed, the brush member may move by means of the elastic restoration force, and the brush member may move until the elastic restoration force of the spring is balanced again with the frictional force between the bristles and the rotary shaft.

DETAILED DESCRIPTION

Figure 1:
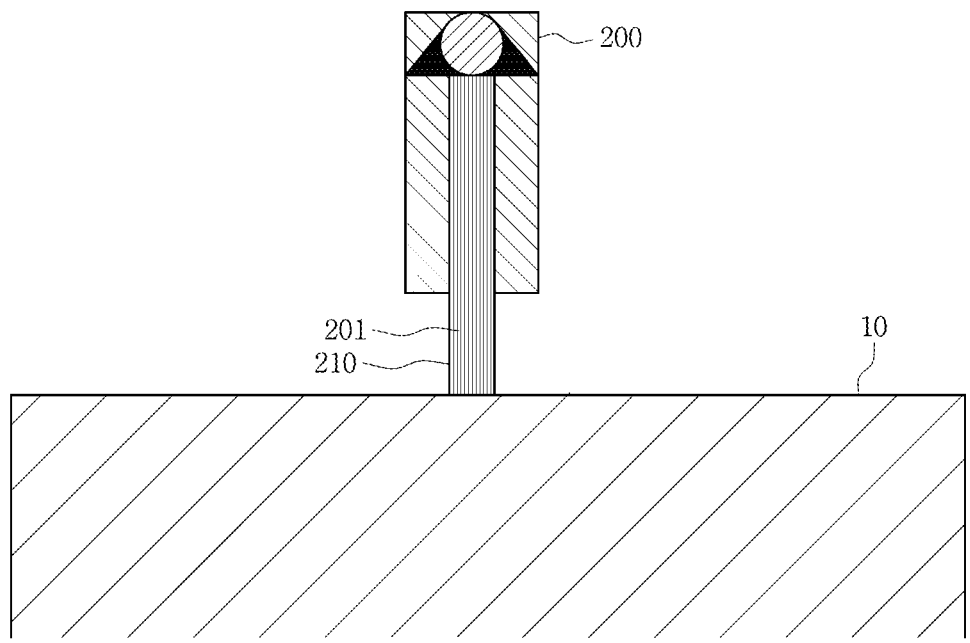
FIGS. 1 and 2 show an existing oil sealing device.
Figure 2:
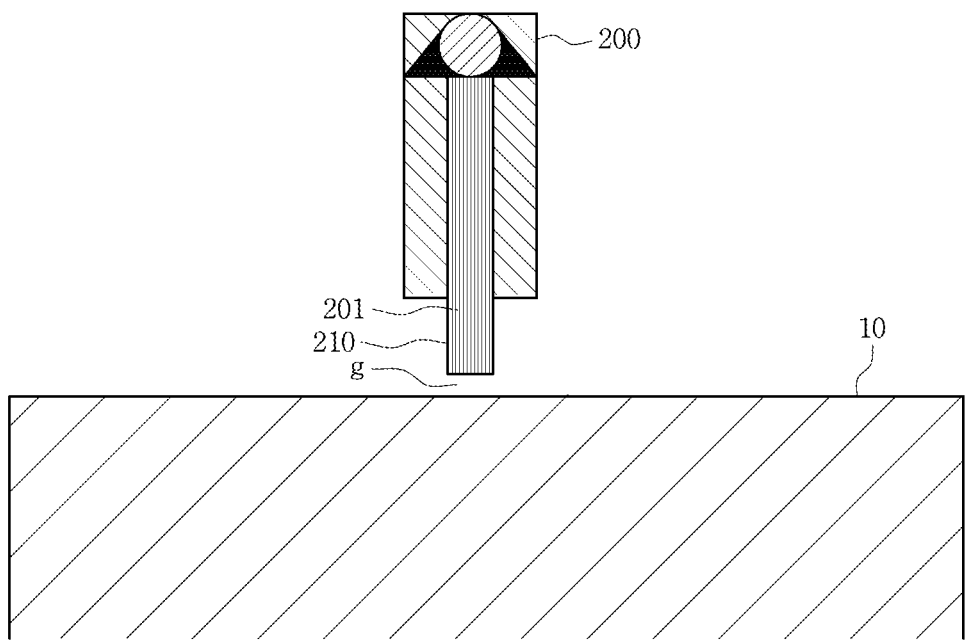

Hereinafter, an embodiment of the present disclosure will be described with reference to the drawings. Even though the present disclosure is described based on the embodiment depicted in the drawings, this is just an example, and the essential configuration and operations of the present disclosure are not limited thereto.

Figure 3:
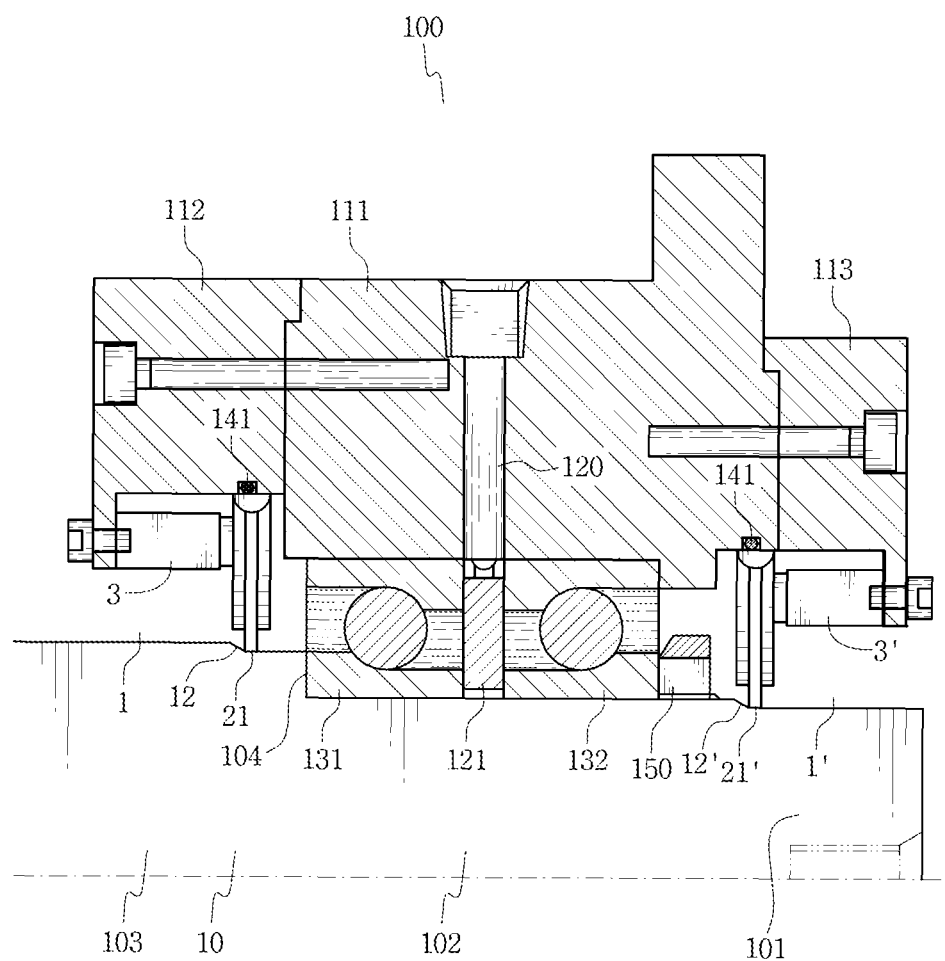
FIG. 3 is a diagram showing a part of a rotating machine having an oil sealing device according to an embodiment of the present disclosure.

FIG. 3 is a diagram showing a part of a rotating machine 100 having an oil sealing device according to an embodiment of the present disclosure.

As shown in FIG. 3, the rotating machine 100 includes a rotary shaft 10 rotating at a high speed, and the rotary shaft 10 is rotatably supported by bearings 131, 132.

The bearings 131, 132 according to this embodiment are ball bearings, which are a kind of ball-and-roller bearings.

An inner wheel of two bearings 131, 132 is inserted into the rotary shaft 10, and an outer wheel of the bearings 131, 132 is fixed to a bearing housing 111. The bearing housing 111 is coupled to a body housing (not shown) of the rotating machine 100.

An oil feeding line 120 for supplying oil to two bearings 131, 132 is formed at the bearing housing 111, and a spacer 121 for supplying oil is disposed between two bearings 131, 132.

The oil supplied through the oil feeding line 120 is diverged at the spacer 121 and then supplied to the bearings 131, 132, respectively, and the oils passing through the bearings 131, 132 are discharged through an oil outlet line (not shown), thereby performing a circulation.

The rotating machine 100 according to this embodiment includes oil sealing devices 1, 1' provided at both sides of the bearings 131, 132, respectively, in order to prevent the oil supplied to the bearing of the bearing housing 111 from being leaked out of the bearing housing 111.

In FIG. 3, two oil sealing devices 1, 1' are disposed between two bearings 131, 132, but it would be understood that the oil sealing devices are disposed at both sides of the bearings 131, 132, respectively, even in this structure, in view of the bearings 131, 132.

Figure 4:
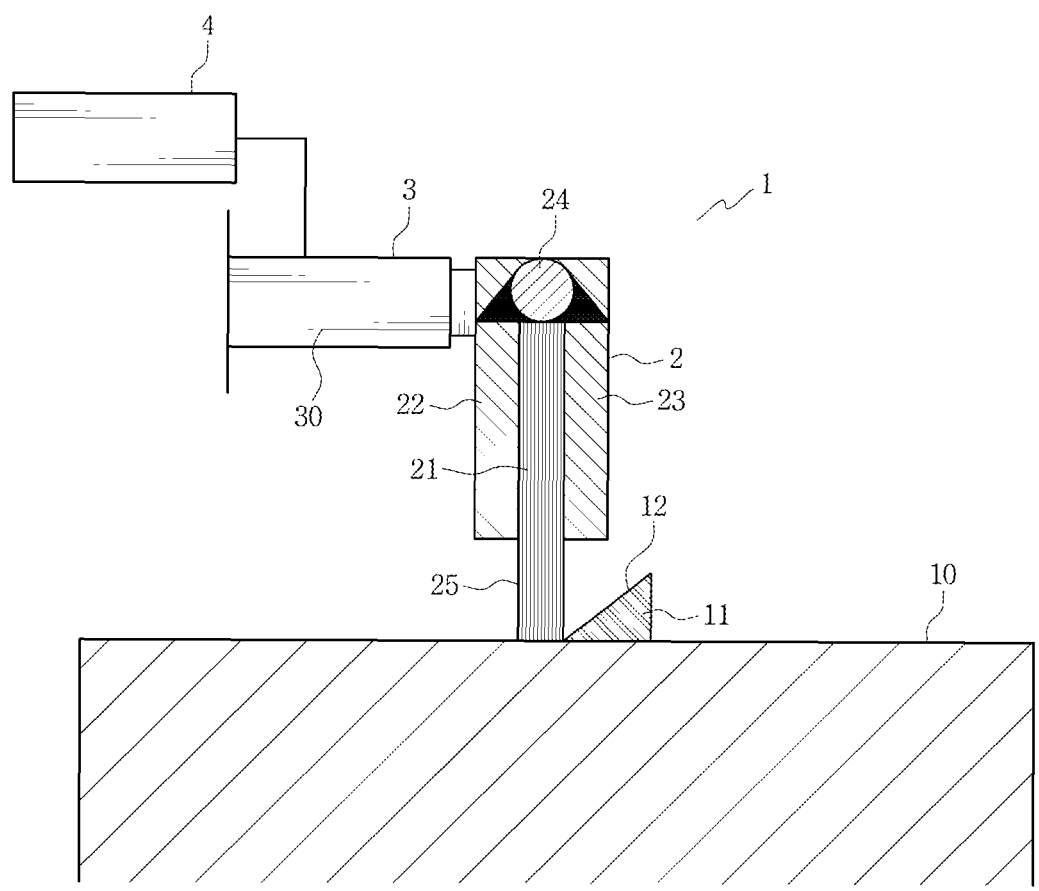
FIG. 4 shows an oil sealing device according to an embodiment of the present disclosure.

FIG. 4 is a diagram showing the oil sealing device 1 according to an embodiment of the present disclosure.

The oil sealing device 1 includes a brush member 2 having a plurality of bristles 21 in direct contact with the rotary shaft 10, an actuator 3 capable of moving the brush member 2 in a length direction of the rotary shaft 10, and a controller 4 for controlling the actuator 3.

The brush member 2 includes a brush 25 composed of a plurality of bristles 21 in contact with the rotary shaft 10, a front plate 23 and a rear plate 22 for supporting the brush 25 at both sides, and a support bar 24 for fixing the front plate 23, the rear plate 22 and the brush 25.

The actuator 3 according to this embodiment is a piezoelectric actuator fabricated by stacking piezoelectric elements (PZT) 30 whose length changes due to a piezoelectric effect when a voltage is applied thereto. The controller 4 supplies a DC voltage enough to operate the piezoelectric actuator 3.

The piezoelectric actuator 3 is connected to a top of the brush member 2. If a voltage is applied to the actuator 3, the brush member 2 may move in a length direction of the rotary shaft 10 according to the changed length of the actuator 3.

Figure 5:
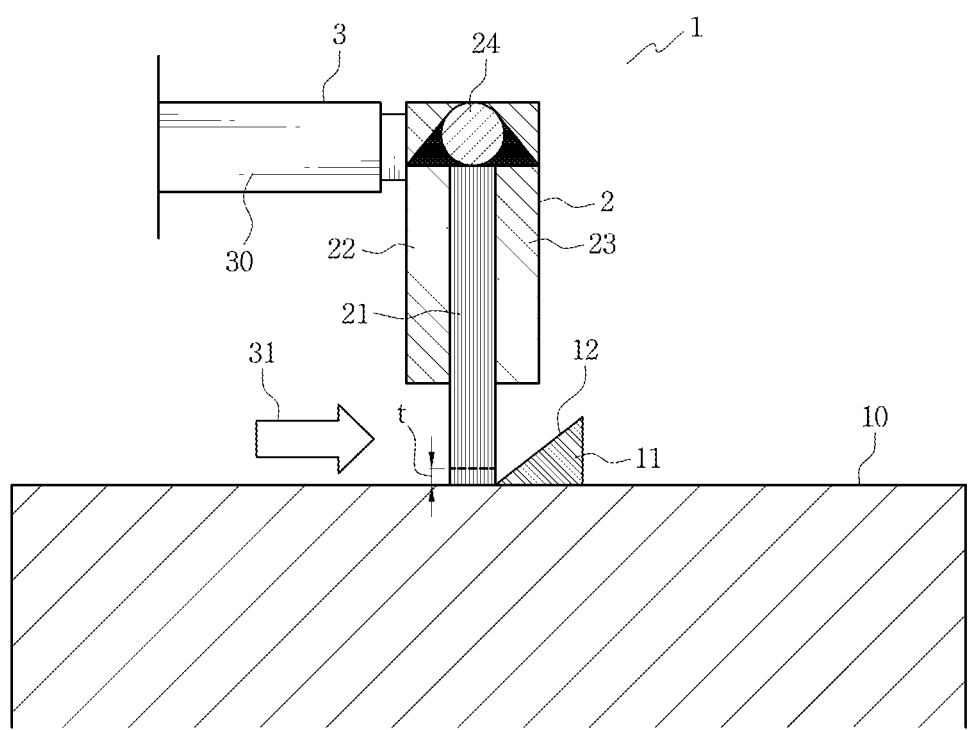
FIGS. 5 to 7 are diagrams for illustrating operations of the oil sealing device of FIG. 4.
Figure 6:
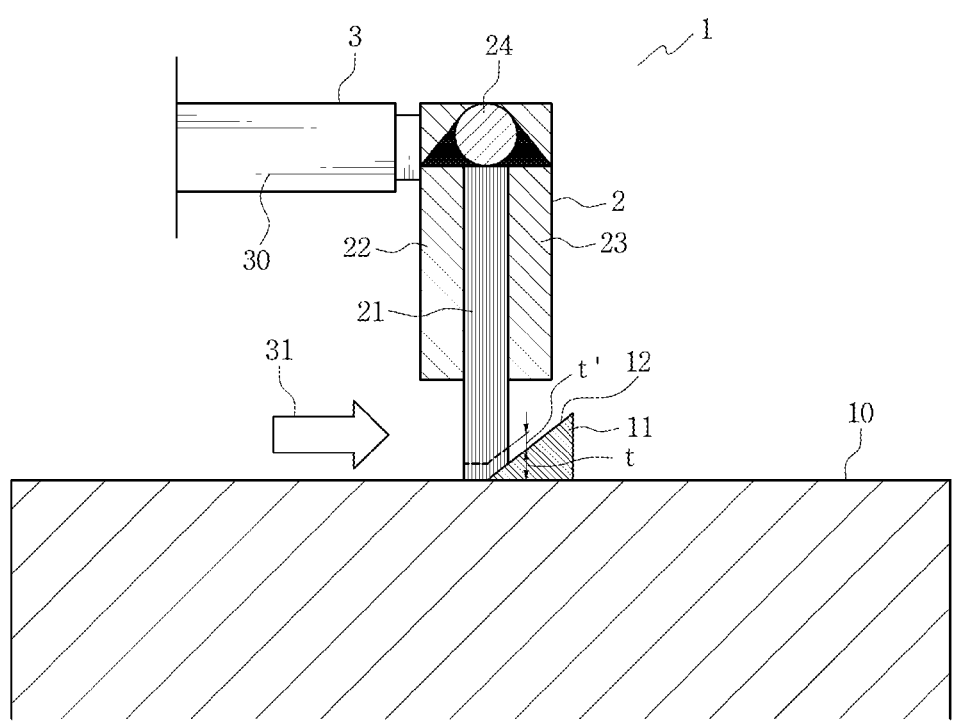
Figure 7:
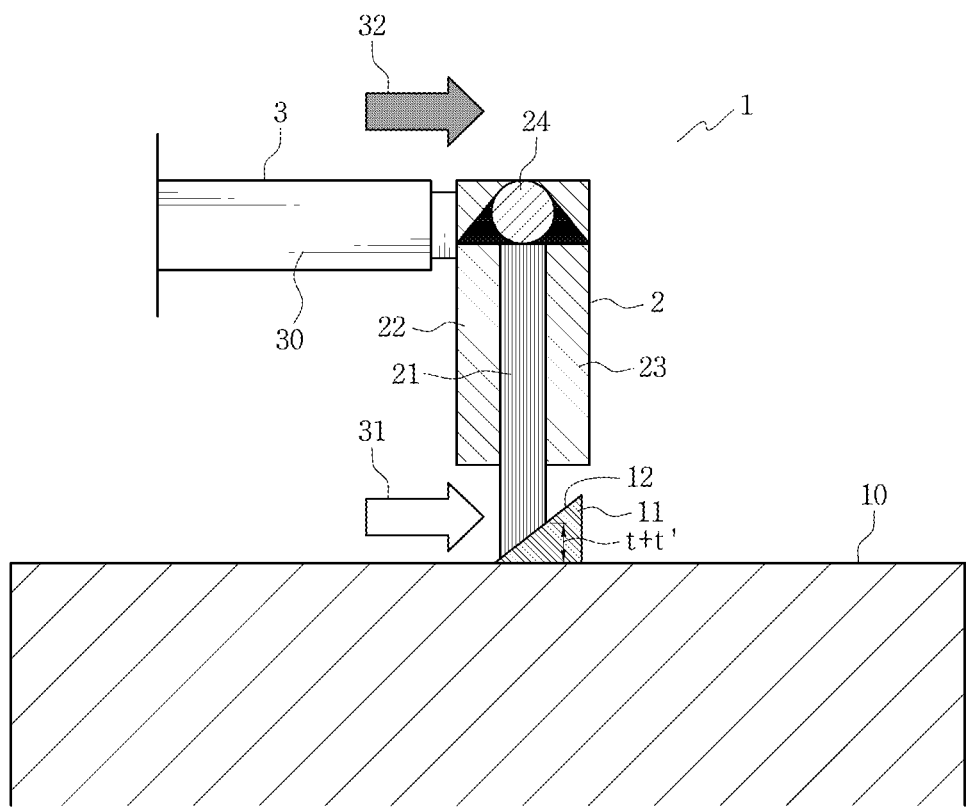

FIGS. 5 to 7 are diagrams for illustrating operations of the oil sealing device 1 according to this embodiment. In FIGS. 5 to 7, the controller 4 is not depicted.

In FIG. 5, the oil sealing device 1 at an initial location is depicted. Referring to FIG. 5, at the initial location, no voltage is applied to the piezoelectric actuator 3, and the bristles 21 are positioned in contact with the rotary shaft 10.

Similar to the existing technique, the bristles 21 prevent the oil of the bearing from leaking out of the bearing housing and also prevent the oil from being scattered, thereby preventing contamination caused by leaked oil and also ensuring smooth rotating operation.

Since the bristles 21 are in direct contact with the rotary shaft 10, during long-time operation, the bristles 21 may be worn to generate a gap.

In order to prohibit such a gap, according to this embodiment, a sloped structure 11 having a sloped surface 12 whose height changes in a length direction of the rotary shaft 10 is formed at the rotary shaft 10.

The sloped structure 11 has a ring shape surrounding the rotary shaft 10. The sloped structure 11 may also be a structure separately prepared and inserted into the rotary shaft 10. However, it should be understood that the sloped surface 12 may formed at the rotary shaft 10 directly, without forming the sloped structure 11 separately (see FIG. 3).

According to this embodiment, the sloped surface 12 is inclined so that its height increases from an outer diameter of the rotary shaft 10 along an oil flowing direction 31. However, depending on the structure and design of the rotating machine 100, the sloped surface 12 may also be inclined in an opposite direction.

According to this embodiment, if the bristles 21 are worn, the actuator 3 pushes the brush member 2 in a direction 32 of the sloped surface 12 to be moved in a length direction of the rotary shaft 10 so that the bristles 21 come into contact with the sloped surface 12.

The controller 4 may control the actuator 3 so that the brush member 2 moves toward the sloped surface 12 at a fixed rate, but in this case, the brush member 2 may not sufficiently cope with the gap.

Therefore, according to this embodiment, the controller 4 moves the brush member 2 so that the bristles 21 climb up along the sloped surface 12 according to an abrasion amount of the bristles 21.

In detail, data about an abrasion amount of the bristles 21 according to a rotation speed and an operation time of the rotary shaft 10 may be provided to or stored in the controller 4, and the controller 4 may control the actuator 3 based on the data.

For example, if a predetermined time T1 passes at a predetermined rotation speed in FIG. 5, it may be experimentally or mathematically expected that the bristles 21 are worn to create a gap with a predetermined height t.

As shown in FIG. 6, the controller 4 applies a voltage to the actuator 3 when the rotary shaft 10 is in operation, thereby increasing a length of the actuator 3 and thus moving the brush member 2 toward the sloped surface 12. Accordingly, the bristles 21 move along the sloped surface 12 and keeps a contact with the sloped surface 12, thereby maintaining a sealing state.

At this time, when the predetermined time T1 passes, the controller 4 moves the brush member 2 so that the bristles 21 come into contact with a location (Location 1) with a height t at the sloped surface 12.

From an initial time 0 to a time T1, the brush member 2 may continuously move little by little to Location 1, or at the time T1, the brush member 2 may move from the initial location to Location 1. However, if the brush member 2 moves little by little continuously, it is possible to cope with a gap created by an unexpected abrasion.

After a predetermined time T2 passes at Location 1, the controller 4 checks an abrasion amount data representing that the bristles 21 are worn to create a gap with a predetermined height t'.

As shown in FIG. 7, when the predetermined time T2 passes, the controller 4 moves the brush member 2 so that the bristles 21 come into contact with a location (Location 2) having a height t+t' at the sloped surface 12. As shown in FIG. 7, the entire bristles of the brush member 2 may come into contact with the sloped surface 12.

Similarly, from the time T1 to the time T2, the brush member 2 may continuously move little by little to Location 2, or at the time T2, the brush member 2 may move from the initial location to Location 2.

By continuously moving the brush member 2 toward the sloped surface 12 little by little as described above or deceasing time intervals for moving the brush member 2, the bristles 21 of the brush member 2 may substantially keep in contact with the rotary shaft 10 (or, the outer diameter or the sloped surface of the rotary shaft). Therefore, it is possible to maintain a sealing state by preventing a gap from being created between the bristles 21 and the rotary shaft 10.

According to this embodiment, even though the bristles are worn, the sealing state is maintained by means of the sloped surface. Therefore, it is enough to exchange the brush member 2 or the bristles after the bristles are worn until all bristles of the brush member 2 are move to the end of the sloped surface. The time for exchanging the bristles 21 of the brush member 2 is delayed as much, and thus time and costs for maintenance of the rotating machine may be reduced.

According to this embodiment, since the sealing device (or, the brush member) moves in a length direction of the rotary shaft according to an abrasion state of the bristles to keep a contact state, it is possible to minimize leakage or scattering of oil, which inevitably happen due to the abrasion of the bristles.

Referring to FIG. 3 again, two oil sealing devices 1, 1' may be disposed at an outer side of the bearing housing 111 at both sides of the bearings 131, 132.

The first oil sealing device 1 and the second oil sealing device 1' are oil sealing devices described in the above embodiment.

As shown in FIG. 3, in the rotating machine 100 of this embodiment, in order to dispose two oil sealing devices 1, 1', the rotary shaft 10 includes a middle diameter portion 102 to which the bearings 131, 132 are coupled, and a large diameter portion 103 and a small diameter portion 101 extending in both directions from the middle diameter portion 102.

At a connection portion of the large diameter portion 103 and the middle diameter portion 102, a bearing placing portion 104 is formed so that the bearing 131 is fixed thereto in a length direction.

At an outer side of the bearing placing portion 104, a first sloped surface 12 is formed so that first bristles 21 of the first oil sealing device 1 come into contact therewith.

Meanwhile, at a connection portion of the small diameter portion 101 and the middle diameter portion 102, a second sloped surface 12' is formed so that second bristles 21' of the second oil sealing device 1' come into contact therewith. According to this embodiment, the first sloped surface 12 and the second sloped surface 12' are formed to be inclined in the same direction.

In this configuration, when the bearings 131, 132 are fit to the middle diameter portion 102 by means of the small diameter portion 101 of the rotary shaft 10, the bearings 131, 132 are not interfered with the second sloped surface 12'.

By pushing and fitting the bearings 131, 132 to the bearing placing portion 104 of the middle diameter portion 102 and coupling a lock nut 150 at an opposite side, the bearings and the rotary shaft may be assembled.

The first oil sealing device 1 is fixed by a first sealing device housing 112 coupled to the bearing housing 111.

A first actuator 3 of the first oil sealing device 1 is fixed to the first sealing device housing 112, and a first controller 4 (not shown in FIG. 3) of the first oil sealing device 1 is fixed at a different location and electrically connected to the first actuator 3.

An end of the brush member of the first oil sealing device 1 comes into contact with a sealing O-ring 141 buried at a groove of the first sealing device housing 112. By means of the sealing O-ring 141, the brush member of the first oil sealing device may move with respect to the housing 112 while keeping a sealing state with the housing 112.

The first bristles 21 of the first oil sealing device 1 come into contact with an outer diameter of the large diameter portion 103 at an initial location, and in operation, the first bristles 21 move along the first sloped surface 12. At this time, the first actuator 3 shrinks in a length direction so that the first bristles 21 move along the first sloped surface 12.

The second oil sealing device 1' is fixed by a second sealing device housing 113 coupled to the bearing housing 111.

A second actuator 3' of the second oil sealing device 1' is fixed to the second sealing device housing 113, and a second controller (not shown in FIG. 3) of the second oil sealing device 1' is fixed at a different location and electrically connected to the second actuator 3'.

An end of the brush member of the second oil sealing device 1' comes into contact with a sealing O-ring 141 buried at a groove of the second sealing device housing 113.

The second bristles 21' of the second oil sealing device 1' come into contact with an outer diameter of the small diameter portion 101 at the initial location, and in operation, the second bristles 21' move along the second sloped surface 12'. At this time, the second actuator 3' shrinks in a length direction so that the second bristles 21' move along the second sloped surface 12'.

As described above, since the first oil sealing device 1 and the second oil sealing device 1' are disposed to face each other, the bristles of each oil sealing device may move close to the bearing. By sealing both sides of the bearing by means of two oil sealing devices, it is possible to prevent the oil from being leaked.

Even though an oil sealing device actively controlled by a controller has been described above, the present disclosure is not limited thereto.

Figure 8:
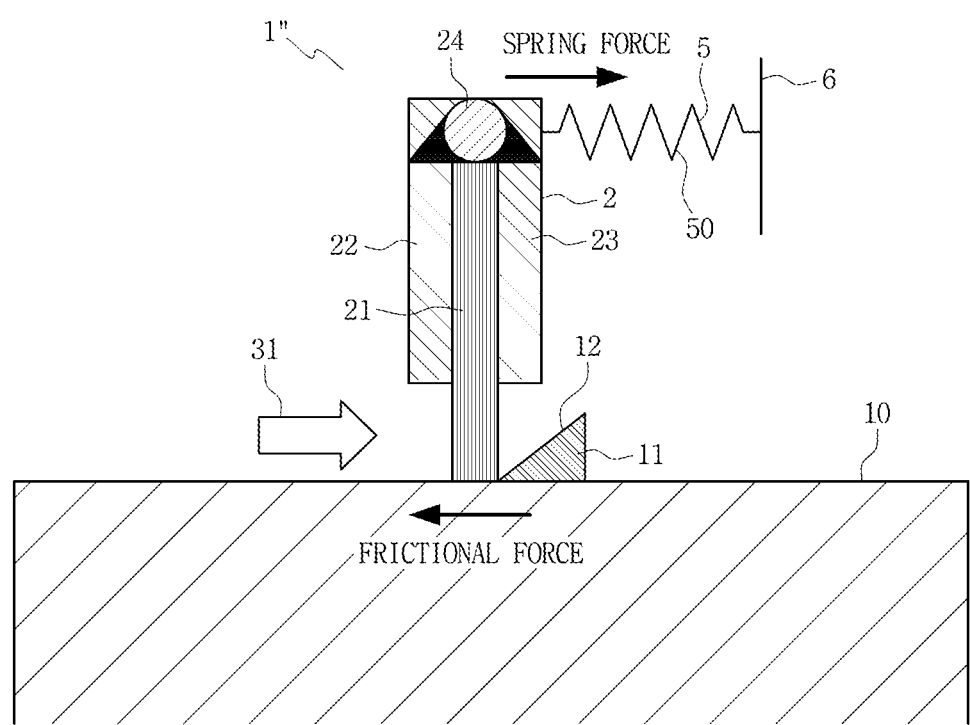
FIGS. 8 and 9 are diagrams for illustrating configurations and operations of an oil sealing device according to another embodiment of the present disclosure.
Figure 9:
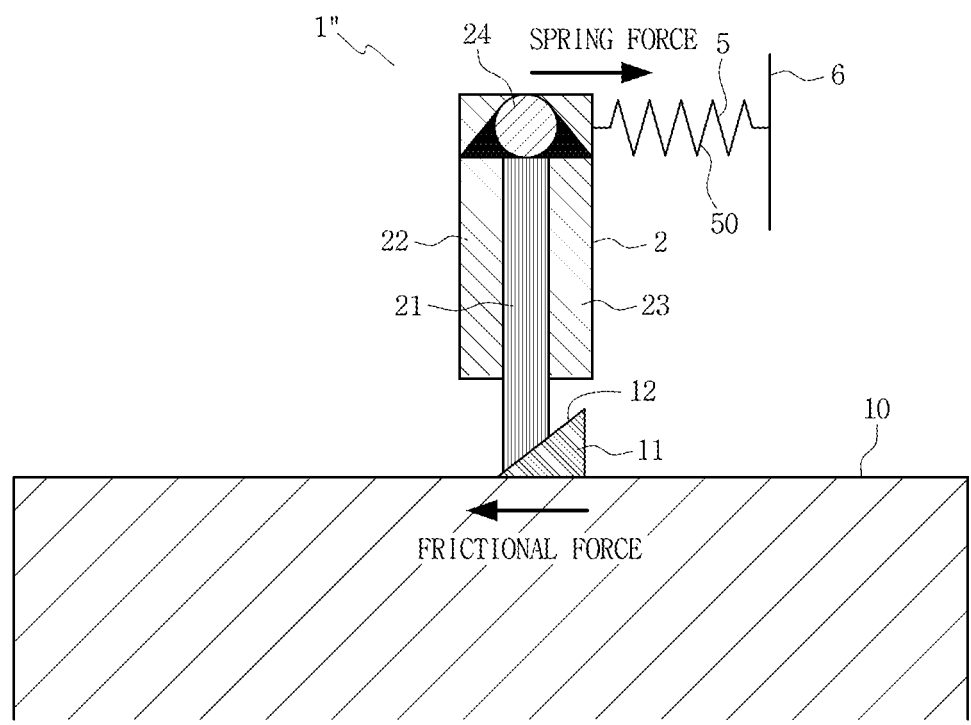

FIGS. 8 and 9 are diagrams for illustrating configurations and operations of an oil sealing device 1" according to another embodiment of the present disclosure.

In the oil sealing device 1" of this embodiment, the brush member 2 is identical to the brush member 2 of the oil sealing devices 1, 1' according to the former embodiment and thus not described in detail here. However, in the oil sealing device 1" of this embodiment, an actuator 5 having a different structure from that of the former embodiment is provided, and a controller is not provided separately.

As shown in FIG. 8, the actuator 5 of this embodiment is a spring actuator having a spring 50 with an elastic restoration force (a spring force) for pushing or pulling the brush member 2 in a length direction of the rotary shaft 10.

If the bristles 21 come into contact with the rotary shaft 10 at an initial location, a predetermined frictional force is applied between them. Here, according to this embodiment, the elastic restoration force of the spring 50 is balanced with the frictional force.

According to this embodiment, the elastic restoration force of the spring 50 is applied to pull the brush member 2 toward the sloped surface 12, and the frictional force is always applied in an opposite direction.

At long-time driving, if at least a part of the plurality of bristles 21 is worn, the entire frictional force between the bristles 21 and the rotary shaft is weakened or removed, which breaks the balance of force.

Therefore, as shown in FIG. 9, the brush member 2 is pulled toward the sloped surface 12 by the elastic restoration force with a relatively greater intensity, and the bristles 21 come into contact with the sloped surface 12.

If the bristles 21 come into contact with the sloped surface 12, a frictional force is generated again, and until the elastic restoration force of the spring 50 is balanced again with the frictional force between the bristles 21 and the rotary shaft 10, the brush member 2 moves to keep the contact between the bristles 21 and the rotary shaft 10.

According to this embodiment, even though the bristles 21 are worn to create a gap temporarily, the gap is very minute (when such a minute gap is created, the frictional force is reduced or removed), the bristles 21 come into contact with the sloped surface 12 within a short time by means of the elastic restoration force. Therefore, the sealing between the bristles 21 and the rotary shaft 10 is substantially maintained, thereby preventing or minimizing a leakage of oil.

According to this embodiment, since it is possible to control according to the abrasion of the bristles of the brush member 2 without a separate controller, the oil sealing device may be actively controlled with a simpler structure.

What is claimed is:

1. An oil sealing device for preventing a leakage of an oil of a bearing which supports a rotary shaft of a rotating machine, the oil sealing device comprising:
   a brush member having a plurality of bristles in contact with the rotary shaft; and
   an actuator configured to move the brush member in a length direction of the rotary shaft,
   wherein a sloped surface having different heights along a length direction of the rotary shaft is formed at the rotary shaft, and
   wherein when the bristles are worn, the actuator moves the brush member in a length direction of the rotary shaft so that the bristles comes into contact with the sloped surface.

2. The oil sealing device according to claim 1,
   wherein the actuator is configured to move the brush member so that the bristles climb up along the sloped surface according to an abrasion amount of the bristles.

3. The oil sealing device according to claim 2, wherein:
   the actuator is a piezoelectric actuator having a piezoelectric element whose length changes when a voltage is applied thereto; and
   the brush member is configured to move according to the changed length of the piezoelectric actuator.

4. The oil sealing device according to claim 3,
   wherein the oil sealing device includes a controller configured to control a length of the piezoelectric actuator by using data of an abrasion amount of the bristles according to a rotation speed and an operation time of the rotary shaft.

5. The oil sealing device according to claim 4, wherein:
   the actuator is a spring actuator having a spring with an elastic restoration force for pushing or pulling the brush member in a length direction of the rotary shaft; and
   the elastic restoration force of the spring is balanced with a frictional force generated when the bristles come into contact with the rotary shaft.

6. The oil sealing device according to claim 5, wherein:
   in response to the bristles being worn, and thus the frictional force between the bristles and the rotary shaft is weakened or removed, the brush member is configured to move by means of the elastic restoration force; and
   the brush member is configured to move until the elastic restoration force of the spring is balanced again with the frictional force between the bristles and the rotary shaft.

7. An oil sealing device for preventing a leakage of an oil of a bearing which supports a rotary shaft of a rotating machine, the oil sealing device comprising:
   a brush member having a plurality of bristles in contact with the rotary shaft;
   an actuator configured to move, based on data of an abrasion amount of the bristles, the brush member in a length direction of the rotary shaft; and
   a sloped surface having different heights along a length direction of the rotary shaft formed at the rotary shaft.

* * * * *